(12) United States Patent
Giove

(10) Patent No.: US 11,193,598 B2
(45) Date of Patent: Dec. 7, 2021

(54) LOW SHEAR BALL-TYPE CONTROL VALVE

(71) Applicant: Control Components, Inc., Rancho Santa Margarita, CA (US)

(72) Inventor: Fabio Giove, Gioia del Colle (IT)

(73) Assignee: CONTROL COMPONENTS, INC., Rancho Santa Margarita, CA (US)

( * ) Notice: Subject to any disclaimer, the term of this patent is extended or adjusted under 35 U.S.C. 154(b) by 0 days.

(21) Appl. No.: 17/031,851

(22) Filed: Sep. 24, 2020

(65) Prior Publication Data

US 2021/0088145 A1 Mar. 25, 2021

Related U.S. Application Data

(60) Provisional application No. 62/905,916, filed on Sep. 25, 2019.

(51) Int. Cl.
*F16K 5/06* (2006.01)
*F15D 1/00* (2006.01)

(52) U.S. Cl.
CPC ............ *F16K 5/0605* (2013.01); *F15D 1/009* (2013.01)

(58) Field of Classification Search
CPC ........ F16K 5/0605; F16K 47/12; F15D 1/009; F16L 55/02772
See application file for complete search history.

(56) References Cited

U.S. PATENT DOCUMENTS

| 4,271,866 A | 6/1981 | Bey |
| 9,671,163 B2 | 6/2017 | Favilli et al. |
| 10,161,528 B2 | 12/2018 | Shen et al. |
| 10,458,554 B2 * | 10/2019 | Gattavari ............... F03B 11/004 |
| 2011/0097154 A1 * | 4/2011 | Chu ........................ F03B 13/00 405/75 |
| 2019/0085800 A1 | 3/2019 | Yoo et al. |
| 2019/0128158 A1 | 5/2019 | Lee |

OTHER PUBLICATIONS

International Search Report for PCT/US2020/052705; dated Dec. 18, 2020.

* cited by examiner

*Primary Examiner* — Michael R Reid
(74) *Attorney, Agent, or Firm* — Stetina Brunda Garred and Brucker; Mark B. Garred

(57) ABSTRACT

A flow control device includes a cylindrical body disposed about a primary axis. The cylindrical body includes a primary flow passage extending therethrough. A ball element having an inlet flow passage extending therethrough is pivotable relative to the cylindrical body between an open position and a closed position. In the open position, the inlet flow passage is in fluid communication with the primary flow passage, and in the closed position, the inlet flow passage is not in fluid communication with the primary flow passage. The flow control device further comprises an internal flow control body having a collar positioned within the cylindrical body about the primary axis. A plurality of outer helical fins extend outwardly from the collar and define a plurality of outer helical passageways, and a plurality of inner helical fins are positioned inwardly from the collar and define a plurality of inner helical passageways.

20 Claims, 10 Drawing Sheets

LOW SHEAR BALL-TYPE CONTROL VALVE

CROSS-REFERENCE TO RELATED APPLICATIONS

This application claims the benefit of U.S. Provisional Application No. 62/905,619, filed Sep. 25, 2019, the entire contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to flow control devices, and more specifically to a ball-type flow control device capable of separating portions of a medium flowing therethrough.

2. Description of the Related Art

When handling fluids flowing under pressure, flow control valves and fluid separators may be used to achieve desired flow qualities and characteristics. The control of kinetic energy and flow speed within a flow control valve may be critical for minimizing the possibility of erosion and vibrations to reduce premature failure of the control component. Furthermore, excessive speed and turbulence in the fluid may result in many undesirable consequences, including uncontrolled water droplet fractionation and the formation of foam and emulsion, which may very likely occur in flows with mixtures of gas and liquids. These flow phases, when agitated by valve trim outlet speed, can enhance the formation of unwanted foam and emulsion, which may be responsible for undesired impurities in separated fluids. The formation of foam and emulsion may also create difficulties in detecting fluid levels inside separators.

The main drivers of downstream performance of separators may be its inlet and upstream conditions. Unfortunately, the design and selection of separators may be made on predefined, simple rules that do not take into account real inlet conditions, such as fluid composition, flow regime, percent of foam/emulsion at the inlet, densities of different fluids, size of bubbles of dispersed phases, etc. Moreover, upstream flow conditions may also be downgraded by the attempt to control the flow by valves positioned at a certain distance before the inlet of the separator. Such valves may create a disturbance at the entrance of such device, that may dramatically reduce the efficiency of the entire process by further fractionating the dispersed phases and generating more foam and emulsions. Rather, the design and selection may be predicated solely on inlet speed or Separator "Inlet Momentum" as may be defined by classic literature on the subject. Even if inlet speed or momentum may be an acceptable design parameter at the initial stage of development of the fluid system, such as a well, such design parameters may be based on empiric rules not universally valid, such that over time, the proportions of gas in the fluid may change and lead to incorrect or inefficient performance by the separator. As such, many separators may require an upgrade to the inlet, with the upgrade typically including a cyclonic inlet, to adjust to the new conditions.

Accordingly, there is a need in the art for a flow control device having a vortex chamber to allow for separation of a medium flowing therethrough. Various aspects of the present disclosure address this particular need, as will be discussed in more detail below.

BRIEF SUMMARY

In accordance with one embodiment of the present disclosure, there is provided a flow control device comprising a cylindrical body disposed about a primary axis. The cylindrical body includes a primary flow passage extending therethrough along the primary axis. The flow control device additionally includes a ball element having an inlet flow passage extending therethrough, with the ball element being pivotable relative to the cylindrical body between an open position and a closed position. In the open position, the inlet flow passage is in fluid communication with the primary flow passage, and in the closed position, the inlet flow passage is not in fluid communication with the primary flow passage. The flow control device further comprises an internal flow control body having a collar positioned within the cylindrical body about the primary axis. A plurality of outer helical fins extend outwardly from the collar and define a plurality of outer helical passageways, and a plurality of inner helical fins are positioned inwardly from the collar and define a plurality of inner helical passageways.

In relation to the dimension of the valve, there is a possibility of having more collars which define the helical flow passages. A plurality of helical flow passages may also be obtained by a unique element that can be casted, 3D printed, or milled directly.

The pivoting of the ball element may be oriented with a vertical axis, or with a horizontal axis in case of presence of solids, or in an angled axis, e.g., offset from both horizontal and vertical directions. The horizontal orientation may provide immediate or quick cleaning of the body from sand and heavy particles residual or accumulated on the bottom of the cylindrical body.

The internal flow control body may be made in one-piece with a valve seat.

The collar may include a first face facing toward the ball element and a second face facing away from the ball element, and a portion of the plurality of inner helical fins may extend beyond the second face.

The internal flow control body may include a central shaft, with the plurality of inner helical fins extending from the central shaft toward the collar.

The number of inner helical passageways may differ from the number of outer helical passageways.

The cylindrical body may include an inlet, an outlet, and an inner surface disposed about the primary axis and extending between the inlet and the outlet. The inner surface may include a variable diameter between the inlet and the outlet. The inner surface may include a first section adjacent the inlet that is of a constant diameter, a second section extending away from the first section that is of a decreasing diameter, and a third section extending away from the second section that is of an increasing diameter.

Each outer helical fin may extend around the collar between 45-1080 degrees.

The inner helical fins may be integrally formed with the collar, or rotatable relative to the collar.

The collar may include opposed ends defining a pair of opposed planes spaced from each other. The inner fins may be sized and configured so as to be bound between the pair of opposed planes. Alternatively, at least one of the inner fins may be sized and configured so as to traverse at least one of the pair of opposed planes.

According to another embodiment, there is provided a flow control device for use with a ball element having an inlet flow passage formed therein. The flow control device includes a cylindrical body disposed about a primary axis, with the cylindrical body having a primary flow passage extending therethrough along the primary axis. The primary flow passage positionable in communication with the inlet flow passage of the ball element to receive fluid therefrom. The flow control device additionally includes an internal flow control body having a collar positioned within the cylindrical body about the primary axis. A plurality of outer helical fins extend outwardly from the collar and define a plurality of outer helical passageways. A plurality of inner helical fins are positioned inwardly from the collar and defining a plurality of inner helical passageways.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
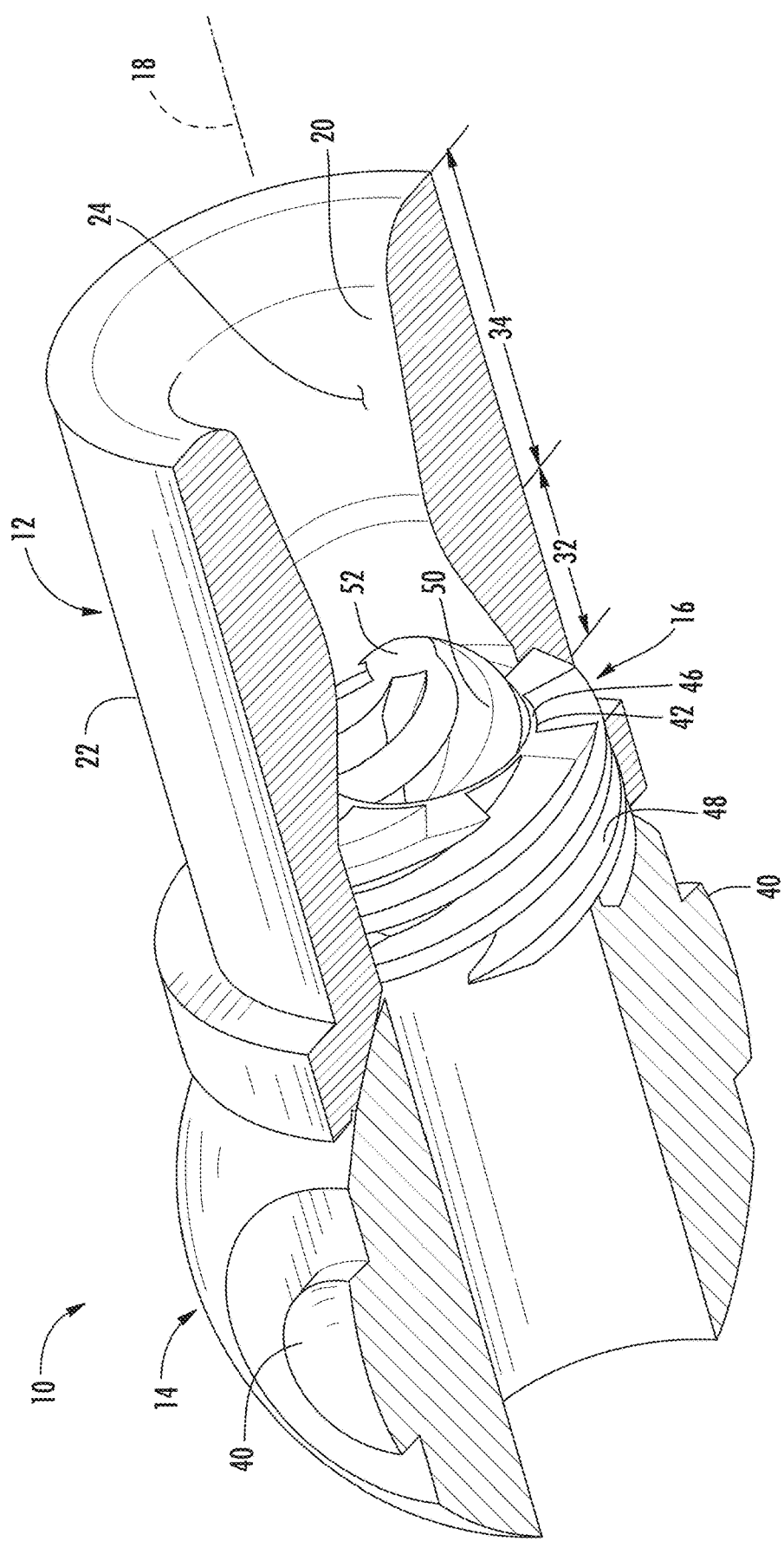
FIG. 1 is a partial cutaway, lower perspective view of a ball-valve type flow control device constructed in accordance with the present disclosure.

Referring now to the drawings, wherein the showings are for purposes of illustrating a preferred embodiment of the present disclosure, and are not for purposes of limiting the same, there is depicted a flow control device 10 capable of providing low shear control of a fluid flowing through the flow control device 10. In this regard, the flow control device 10 may be operative to subject a fluid flowing therethrough, such as a gas-oil-water mixture, to variable and controllable g-forces for handling or separating foam and emulsions from the remainder of the mixture. The flow control device 10 may generate vorticity along a flow passageway. The vorticity may be created by an internal flow control body including a plurality of helical fins which define a corresponding plurality of helical passageways which promotes a rotational fluid flow in the fluid as the fluid passes through the internal flow control body. Furthermore, the configuration of the passageway within the flow control device 10 may create a vortex chamber, the shape of which may foster continued rotational flow of the fluid after it exits the internal flow control body.

Figure 2:
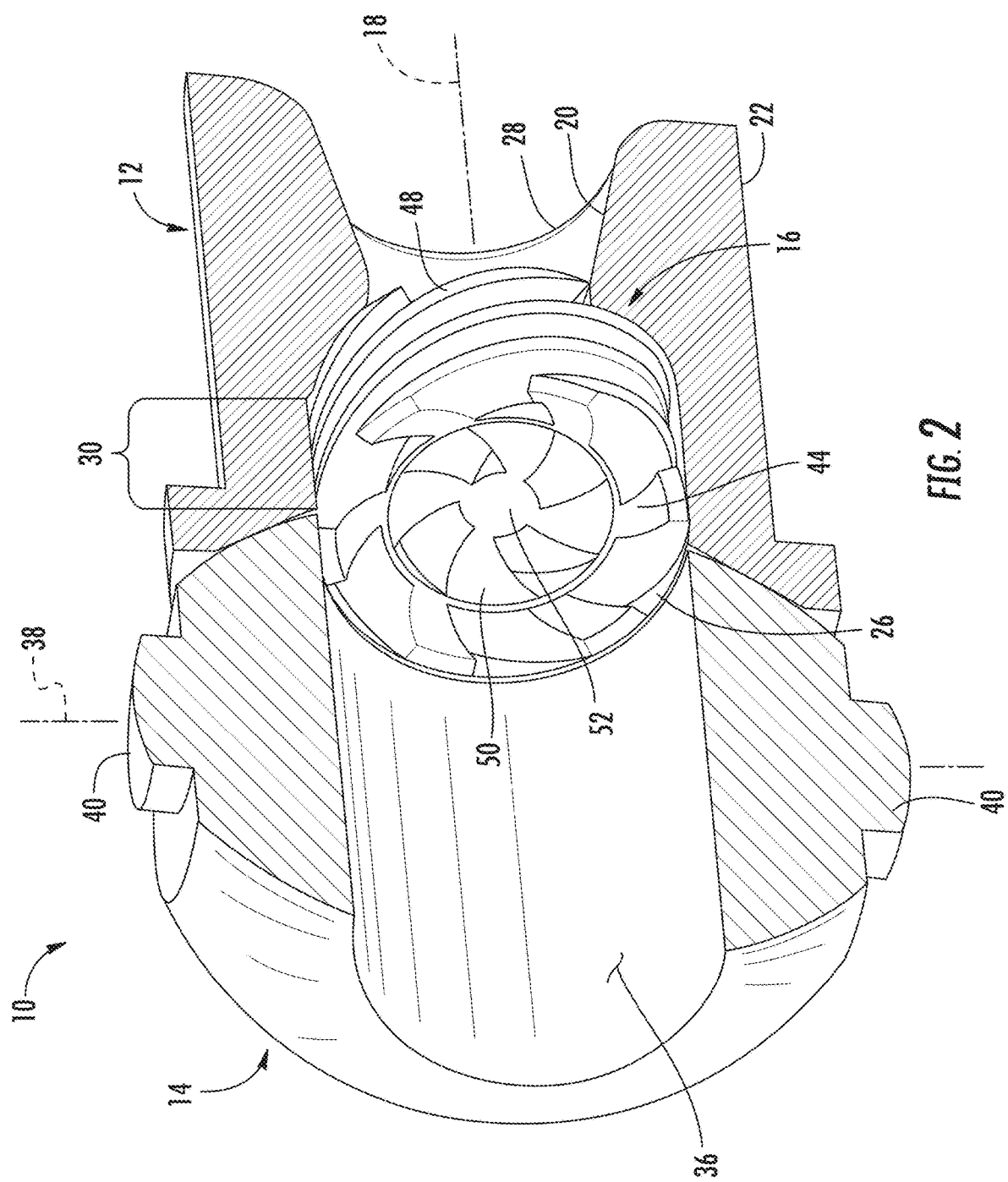
FIG. 2 is a partial cutaway, upper perspective view of the flow control device.

Referring now specifically to FIGS. 1 and 2, the flow control device 10 is a ball valve generally including a cylindrical body 12, a ball element 14, and internal flow control body 16. The cylindrical body 12 is disposed about a primary axis 18 and includes an inner surface 20 and an outer surface 22. The inner surface 20 defines a primary flow passage 24 which extends from a primary inlet 26 (see FIG. 2) to a primary outlet 28. The outer surface 22 defines a generally uniform outer diameter, while the inner surface 20 defines a variable diameter along the length thereof. In particular, in a direction from the primary inlet 26 to the primary outlet 28, the inner surface 20 may include a constant first diameter section 30 adjacent the primary inlet 26, a second decreasing diameter section 32 extending from the constant first diameter section 30, and then a third increasing diameter section 34 extending from the second decreasing diameter section 32. The variable diameter of the inner surface 20 may shape the passageway 24 to function as a vortex chamber which promotes the formation of vortices, as will be described in more detail below.

The flow control device 10 further includes the ball element 14 configured to control the passage of fluid into the cylindrical body 12. The ball element 14 may include an inlet flow passage 36 formed therein, with the inlet flow passage 36 being selectively moveable into and out of communication with the primary flow passage 24 to control fluid flow through the flow control device 10. The ball element 14 may be pivotable relative to the cylindrical body 12 between an open position and a closed position to control fluid communication between the ball element 14 and the cylindrical body 12. When the ball element 14 is in the open position, the inlet flow passage 36 is in fluid communication with the cylindrical body 12, and when the ball element 14 is in the closed position, the inlet flow passage 36 is not in fluid communication with the cylindrical body 12. Rather, when the ball element 14 is in the closed position, a portion of the ball element 14 extends between the inlet flow passage 36 and the cylindrical body 12 to prevent fluid from being communicated therebetween. The inlet passage 36 may extend diametrically through the ball element 14 along an axis that is generally perpendicular to the pivot axis 38. As an alternatively, it is contemplated that the inlet passage 36 may include a bend, curve or elbow, and thus, may not extend diametrically therethrough.

The ball element 14 may be pivotable about a pivot axis 38 that may be generally perpendicular to the primary axis 18. The pivot axis 38 may be oriented in any direction, such as vertically or horizontally to avoid sand and particles to compromise valve seat tightness of contact between the ball element 14 and its corresponding seat, which may be formed on the cylindrical body 12. The ball element 14 and the cylindrical body 12 may include complementary surfaces to allow for the pivoting motion of the ball element 14 relative to the cylindrical body 12. The complementary surfaces may include the outer surface of the ball element 14, and a corresponding concave surface on the cylindrical body 12. The ball element 14 depicted in FIGS. 1 and 2 additionally include a pair of diametrically opposed protrusions 40 which may be used for controlling the ball element 14 between the closed and open positions.

The internal flow control body 16 is positioned within the cylindrical body 12 and is configured to convert substantially linear fluid flow directed into the cylindrical body 12 from the ball element 14 into rotational fluid flow. As will be described in more detail below, the rotational fluid flow may be promoted by a plurality of helical flow passages extending through the internal flow control body 16 that impart vorticity on the fluid flowing therethrough.

According to one embodiment, the internal flow control body 16 includes a collar 42 having a first face 44 and an opposing second face 46. The collar 42 is positioned within the cylindrical body 12 about the primary axis 18, with the first face 44 facing the ball element 14 and the second face 46 facing away from the ball element 14. The internal flow control body 16 further includes a plurality of outer helical fins 48 extending outwardly from the collar 42 and defining a plurality of outer helical passageways. Each of the outer helical fins 48 may extend in an axial direction between the first and second faces 44, 46, as well as a circumferential direction along an outer surface of the collar 42. The magnitude (e.g., angle) by which each out helical fin 48 extends may vary. For instance, in one embodiment, each outer helical fin 48 may extend only 45 degrees from the first face 44 to the second face 46 (e.g., extend across only one-eighth of the circumference of the collar 42). In another embodiment, each outer helical fin 48 may extend 1080 degrees from the first face 44 to the second face 46 (e.g., extend across the circumference to complete three revolutions). In the embodiment depicted in each of FIGS. 1-9, each of the outer helical fins 48 extend approximately 180 degrees about the circumference. The magnitude of the helical fin circumferential extension may be predicated on a number of factors, such as the velocity of fluid, the viscosity of fluid, composition of the fluid, size of the flow control device 10, etc.

In addition to the outer helical fins 48, the internal flow control body 16 may include a plurality of inner helical fins 50 and a central shaft 52, with the inner helical fins 50 being positioned inwardly from the collar 42 and extending outwardly from the central shaft 52 to define a plurality of inner helical passageways. It is contemplated that the inner helical fins 50 and central shaft 52 may be integrally formed with the collar 42, or alternatively, the inner helical fins 50 and central shaft 52 may be separate from the collar 42. In the case of the inner helical fins 50 and the central shaft 52 being separate from the collar 42, it is contemplated that the inner helical fins 50 and central shaft 52 may rotate relative to the collar 42.

The central shaft 52 and inner helical fins 50 may extend from the first face 44 and protrude beyond the second face 46 to define an exposed distal portion. It is also contemplated that the central shaft 52 and inner helical fins 50 may be of the same axial length as the collar 42 and outer helical fins 48, in which case there is no exposed distal portion.

Each of the inner helical fins 50 may extend in an axial direction, as well as a circumferential direction along an outer surface of the central shaft 52. The magnitude (e.g., angle) by which each inner helical fin 50 extends may vary. For instance, in one embodiment, each inner helical fin 50 may extend only 45 degrees from a first end of the central shaft 52 (i.e., the end adjacent the first face 44 of the collar 42) to the opposite second end of the central shaft 52 (e.g., extend across only one-eighth of the circumference of the collar 42). In another embodiment, each inner helical fin 50 may extend 1440 degrees from the first end to the second end (e.g., extend across the circumference to complete four revolutions) of the central shaft 52. Similar to the outer helical fins 48 discussed above, the magnitude of the inner helical fin circumferential extension may be predicated on a number of factors, such as the velocity of fluid, the viscosity of fluid, composition of the fluid, size of the flow control device 10, etc.

It is contemplated that the number of inner fins 50 may be similar to the number of outer fins 48, or alternatively, the number of inner fins 50 may differ from the number of outer fins 48. Furthermore, the helical angle of the inner fins 50 may be similar or different from the helical angle of the outer fins 48.

The central shaft 52 may extend beyond the inner helical fins 50 and include a conically shaped surface, which terminates in a tip. The conical surface may promote rotational fluid flow as the fluid exits the inner helical grooves and flows over the conical surface.

Figure 2A:
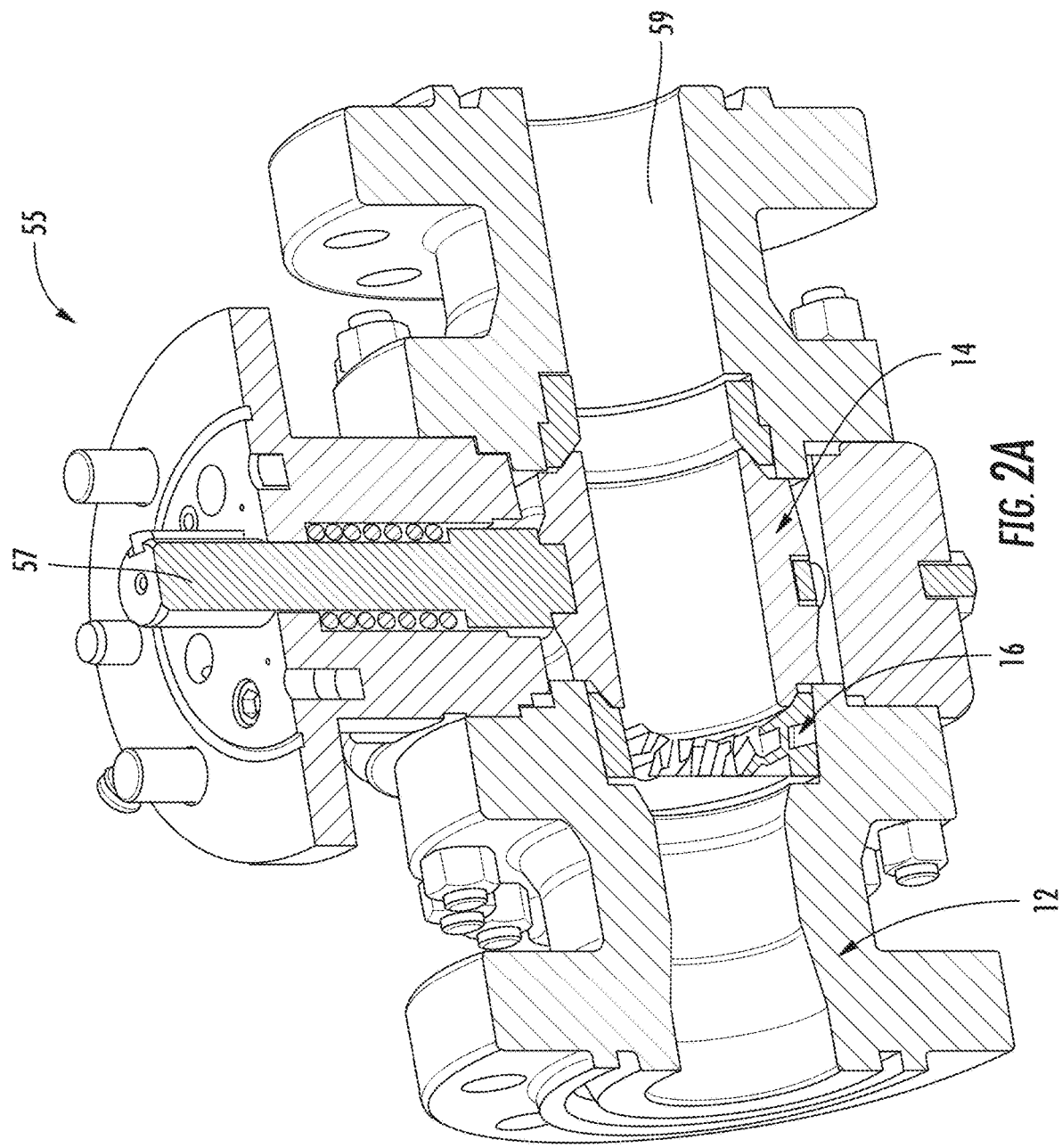
FIG. 2A is a cross sectional view of a valve assembly incorporating an embodiment of the flow control device therein.

Referring now to FIG. 2A, there is depicted an embodiment of the flow control device 10 integrated into a larger valve assembly 55. As can be seen in FIG. 2A, the valve assembly 55 may include a valve stem 57 extending from the ball element 14 to control rotation of the ball element 14 relative to the cylindrical body 12. The ball element 14 depicted in FIG. 2A is in the open position to allow fluid to pass through an inlet passageway 59, through the ball element 14, through the internal flow control body 16, and through the cylindrical body 12.

Referring now specifically to FIGS. 3-9, there is depicted a sequence of fluid flowing through the flow control device 10.

Figure 3:
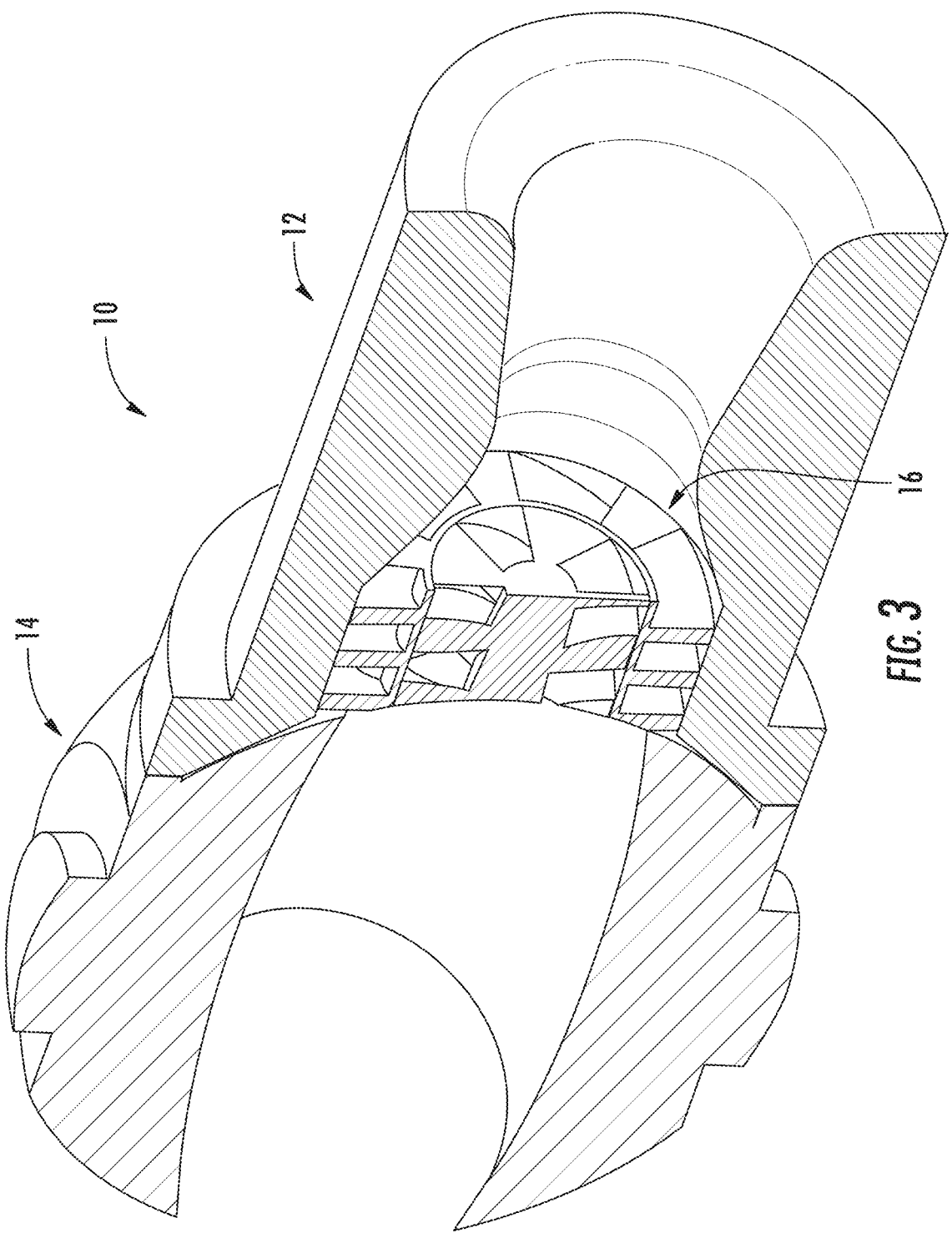
FIG. 3-9 are cross sectional views depicting an exemplary sequence of fluid flowing through the flow control device, and the vorticity imparted to the fluid as it flows through the flow control device.
Figure 4:
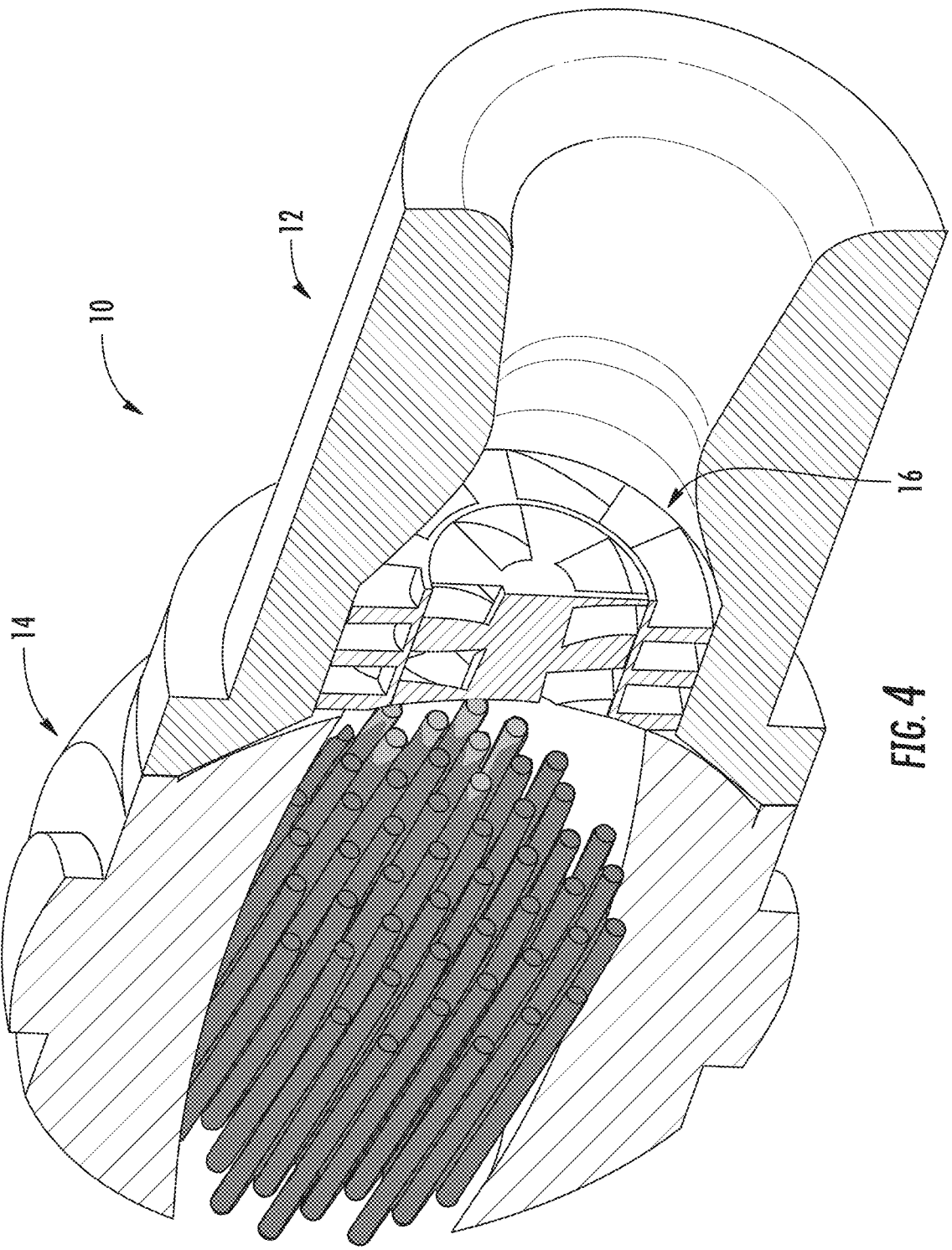
Figure 4:
Figure 5:
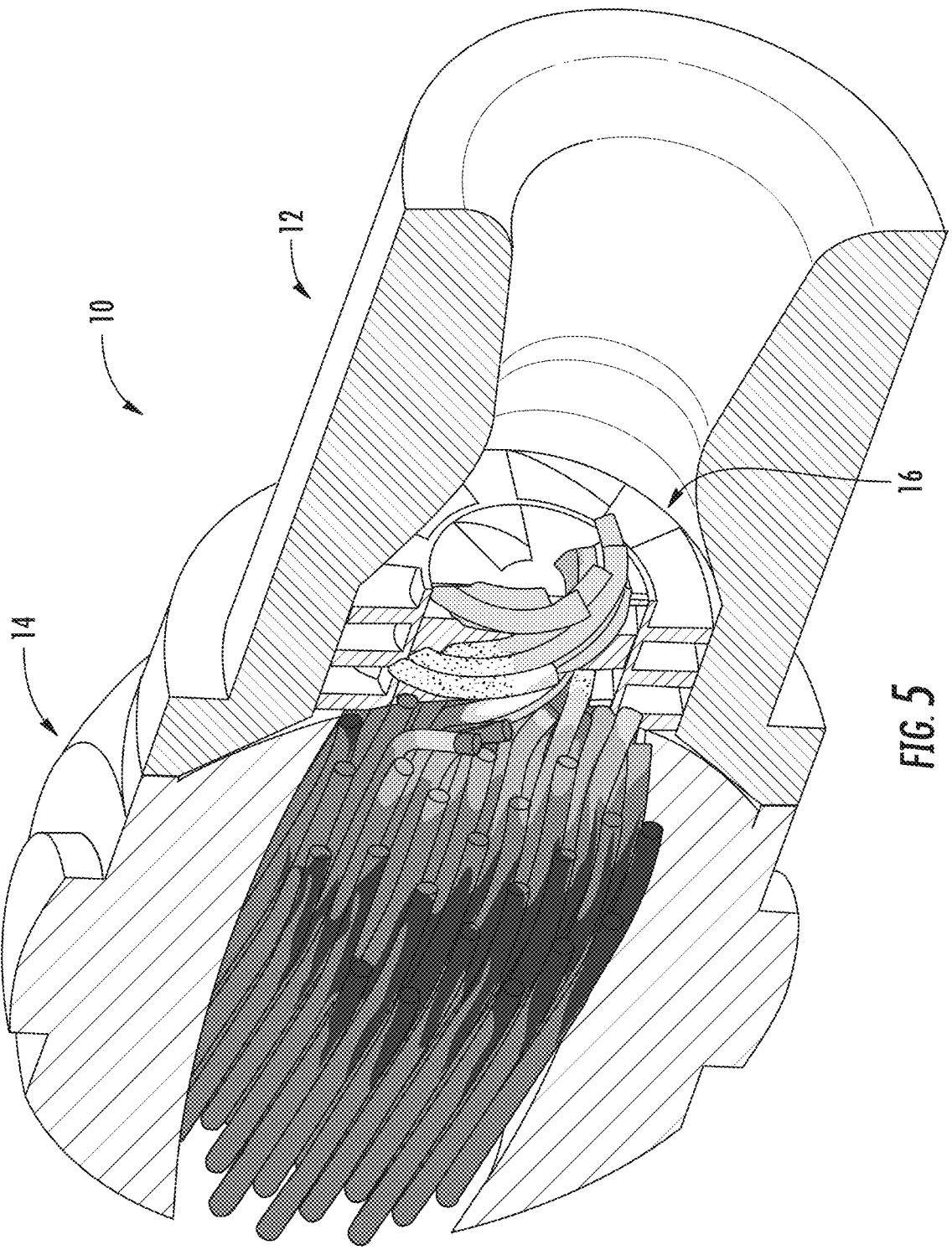
Figure 5:
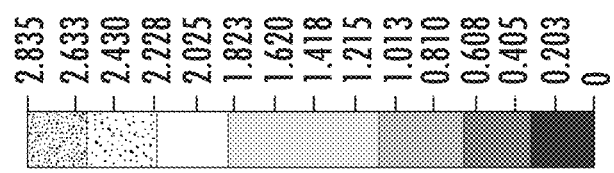
Figure 6:
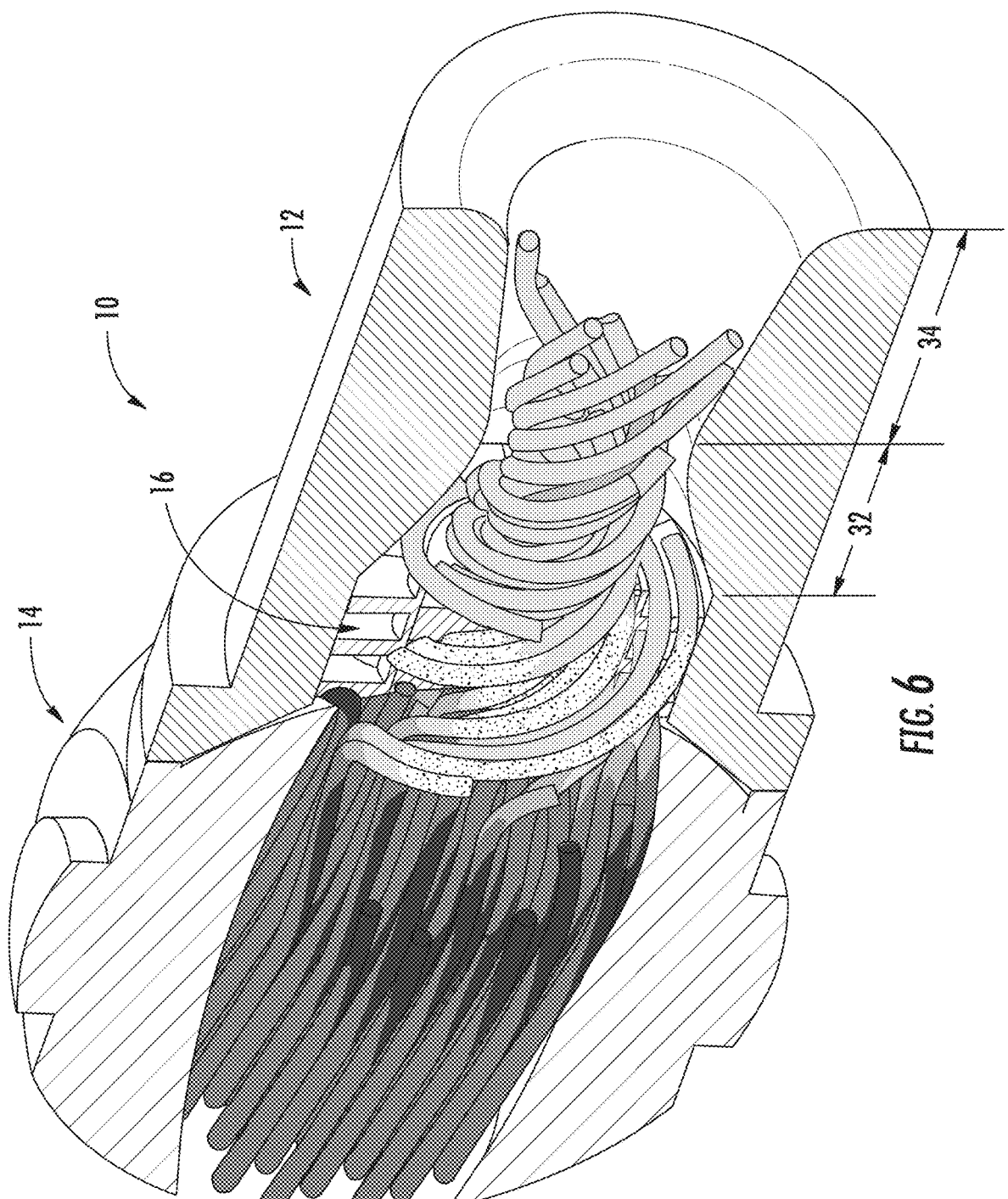

FIG. 3 shows the flow control device 10 without any fluid flowing therethrough. FIG. 4 shows fluid that has entered the ball element 14 but has not yet reached the cylindrical body 12 or the internal flow control body 16. As can be seen, the fluid flowing through the ball element 14 may be a substantially linear flow. As is further shown by the example in FIG. 4, the linear fluid flow through the ball element 14 may have a velocity in the range of approximately 0-1.013 m/s FIG. 5 shows a downstream portion of the fluid flow having entered the cylindrical body 12 and passing through the internal flow control body 16. In particular, fluid is funneled by the ball element 14 toward the internal flow control body 16 and is divided between the inner helical passageways and the outer helical passageways of the internal flow control body 16 as the fluid enters the internal flow control body 16 and passes therethrough. In the example shown in FIG. 5, as the fluid flow transitions from the linear flow through the ball element 14 to the rotational flow in and through the internal flow control body 16, the velocity of the fluid may increase. In greater detail, the velocity of fluid flowing through the inner and outer helical passageways may be in the range of approximately 1.013-2.835 m/s. As shown in FIGS. 5 and 6 with reference to the velocity scales included therein, the fluid velocity proximate the inflow ends and in the upstream portions of the inner and outer helical passageways may slightly exceed that at the downstream portions and outflow ends thereof.

FIG. 6 further shows the downstream portion of the fluid flow having exited the internal flow control body 16 and having desired rotational flow characteristics imparted thereto. Whereas FIG. 5 shows that flow through the internal flow control body 16 may commence with flow through the inner helical passageways, FIG. 6 shows that such flow may either simultaneously or subsequently pass through outer helical passageways. As the fluid exits the internal flow control body 16, the fluid sequentially flows through the narrowing second section 32 of the internal flow control body 16, and then through the widening third section 34 of the internal flow control body 16. In the example shown in FIG. 6 and as indicated above, the fluid having the greatest velocity tends to occur at the upstream portions of the inner helical passageways proximate the inflow ends thereof as results from the linear fluid flow transitioning to rotational fluid flow with a tight or narrow radius (as facilitated by passing into and through the inner helical passageways). While the velocity of fluid flowing along the flow path that is wider in radius (as facilitated by passing into and through the outer helical passageways) may be generally the same as or even greater than that through the inner helical passageways defining the narrow radius flow paths, it nonetheless tends to be comparatively lower. For instance, the fluid flowing from the outflow ends of the outer helical passageways may have a velocity in the range of 1.013-2.025 m/s, while the fluid flowing from the outflow ends of the inner helical passageways may have a velocity in the range of 1.013-2.430 m/s. As also indicated above, as fluid flows through both the inner and outer helical passageways, the velocity may (but not necessarily) decrease from the upstream end of the internal flow control body 16 to the downstream end of the internal flow control body 16.

Figure 7:
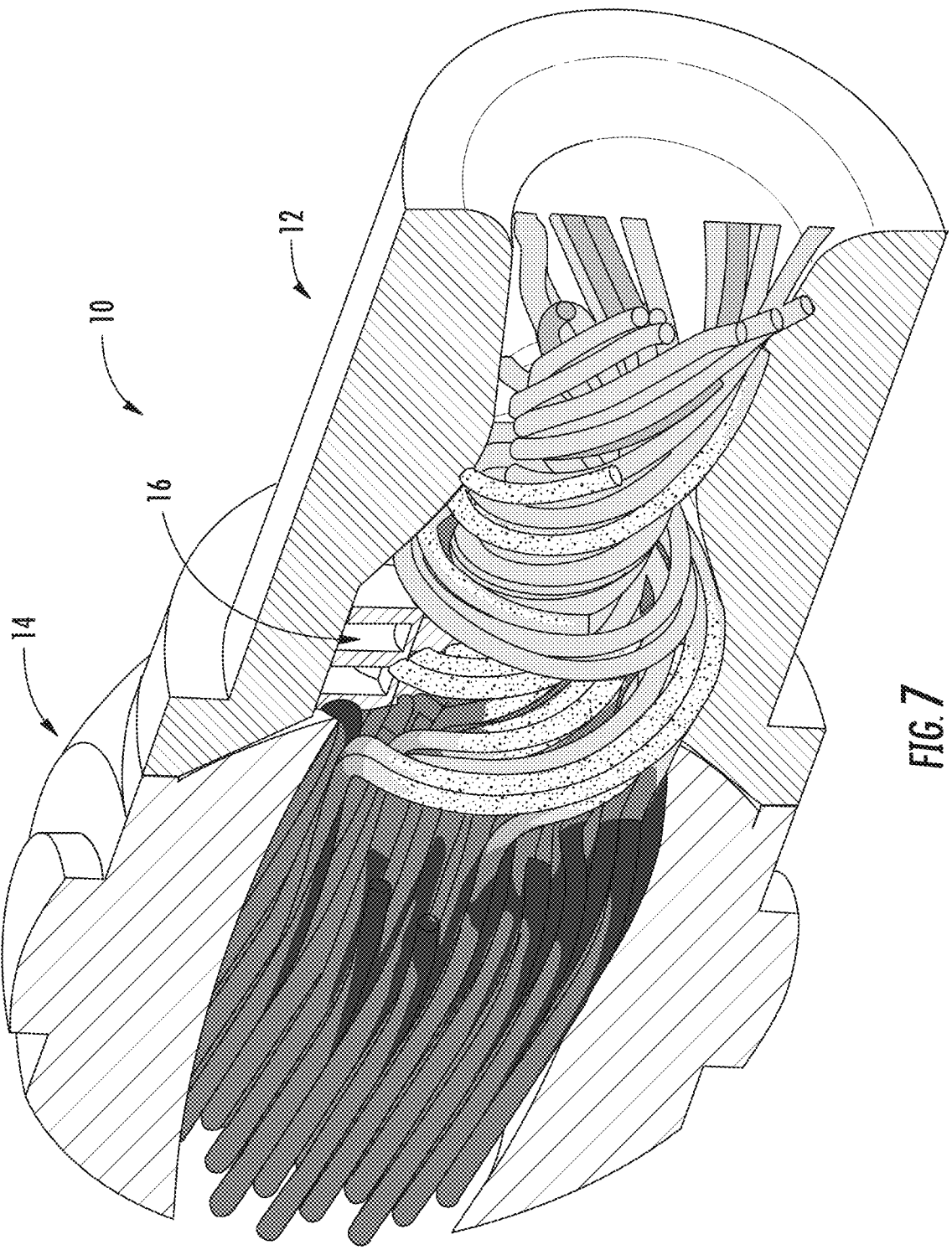
Figure 7:
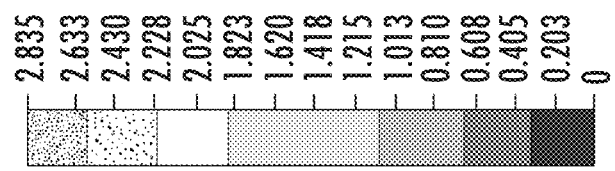
Figure 8:
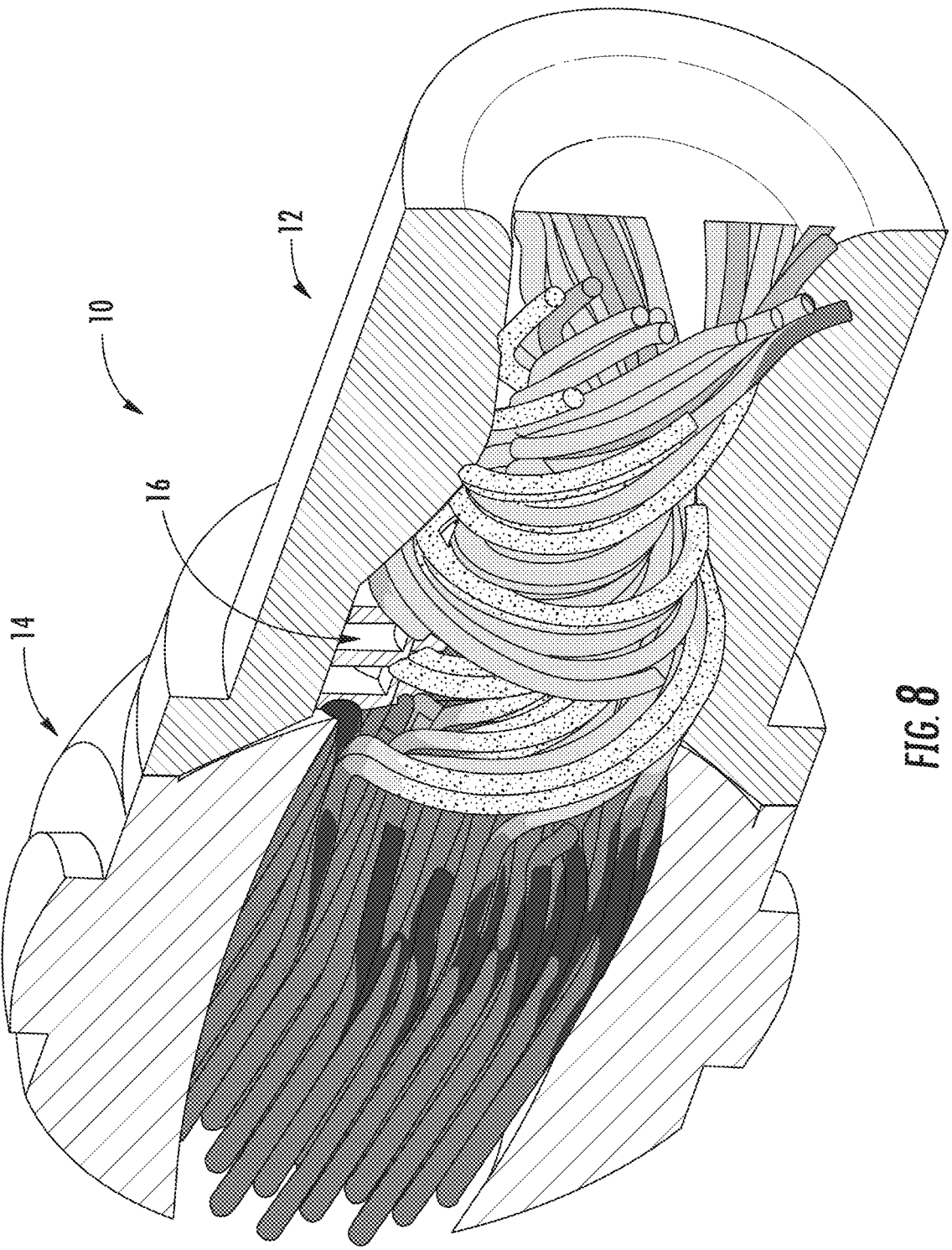
Figure 9:
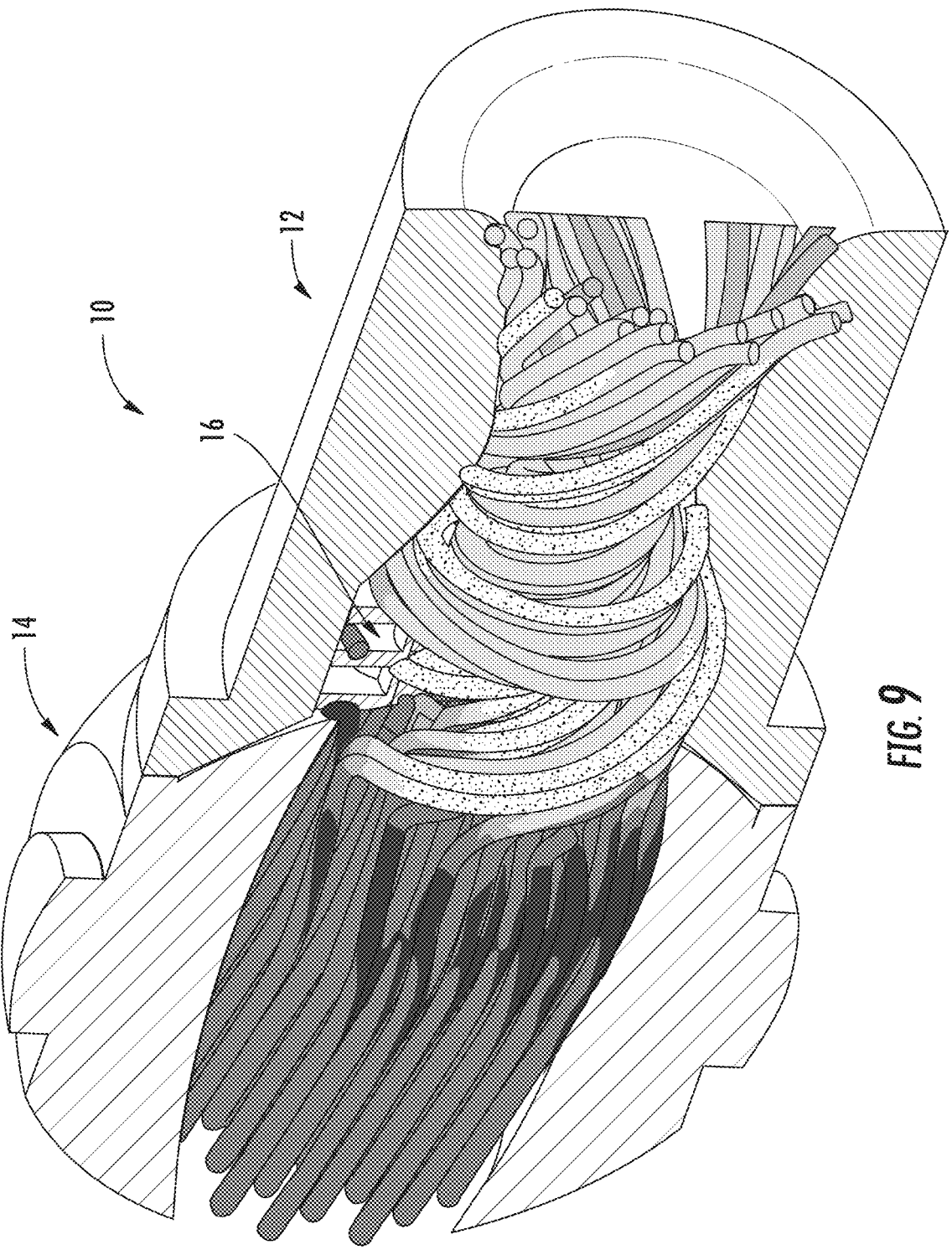
Figure 9:

FIGS. 7-9 show the volume of fluid that has exited the internal flow control body 16. The fluid downstream of the internal flow control body 16 is in a rotational flow and passes through the cylindrical body 12, first through the narrowing second section 32 and then through the widening third section 34 as indicated above. FIGS. 5-9 demonstrate that the rotation imparted to the fluid resulting from its passage through internal flow control body 16 is of increased velocity in comparison to that upstream of the internal flow control body 16 as shown in FIG. 4. FIGS. 7-9, considered with reference to the velocity scales included therein, further show that the velocity of the fluid exiting the inner and outer helical passageways of the internal flow control body 16 may undergo a slight increase by virtue of the transition into the narrowing second section 32, while thereafter also experiencing a slight subsequent decrease by virtue of the transition into the widening third section 34. Whereas this velocity increase tends to be more apparent in the rotational fluid flow emanating from the outer helical passageways, the velocity decrease tends to be more apparent in the rotational fluid flow emanating from the inner helical passageways. However, FIGS. 7-9 also demonstrate that there is typically (but not necessarily) a velocity decrease in the rotational fluid flow emanating from the outer helical passageways resulting from the transition from the second section 32 to the third section 34, though it is typically less than the velocity decrease in the rotational fluid flow emanating from the inner helical passageways resulting from the transition from the second section 32 to the third section 34. The velocity of the radially outward fluid flow emanating from the outer helical passageways and flowing through the second section 32 may be in the range of 1.013-2.430 m/s, decreasing to the range of 0.203-2.025 m/s in the third section 34. The velocity of the radially inner fluid flow emanating from the inner helical passageways and flowing through the second section 32 may be in the range of 1.013-2.430 m/s, decreasing to the range of 0.203-2.025 m/s in the third section 34. Thus, as the fluid transitions from the decreasing diameter second section 32 to the increasing diameter third section 34, the fluid velocity may decrease.

As the fluid flows through the inner and outer helical grooves, gas may form along the surface of the grooves by localized flashing to separate the gas from the remaining portion of the fluid.

It is contemplated that any fluid velocity provided herein is given as an example and is not intended to limit the scope of the present disclosure. In this regard, the flow control device 10 is contemplated to accommodate fluid flows having different velocities, and to potentially increase and/or decrease those velocities in any of a multiplicity of different ways, together with imparting a rotational or spiral flow pattern to the fluid flow. In this regard, it is contemplated that outer and inner helical fins 48, 50 may be sized and arranged in any one of a number of differing configurations as results in the inner and outer passageways in turn being sized and arranged relative to each other as needed to achieve prescribed flow velocities and rotational flow characteristics.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A flow control device comprising:
a body disposed about a primary axis, the body having a primary flow passage extending therethrough along the primary axis;
a ball element having an inlet flow passage extending therethrough, the ball element being pivotable relative to the body between an open position, wherein the inlet flow passage is in fluid communication with the primary flow passage, and a closed position, wherein the inlet flow passage is not in fluid communication with the primary flow passage; and
an internal flow control body having a collar positioned within the body about the primary axis, a plurality of outer helical fins extending outwardly from the collar and defining a plurality of outer helical passageways, and a plurality of inner helical fins positioned inwardly from the collar and defining a plurality of inner helical passageways.

2. The flow control device recited in claim 1, wherein the internal flow control body includes a central shaft, the plurality of inner helical fins extending from the central shaft toward the collar.

3. The flow control device recited in claim 1, wherein the number of inner helical passageways differs from the number of outer helical passageways.

4. The flow control device recited in claim 1, wherein the body includes an inlet, an outlet, and an inner surface disposed about the primary axis and extending between the inlet and the outlet, the inner surface having a variable diameter between the inlet and the outlet.

5. The flow control device recited in claim 4, wherein the inner surface includes a first section adjacent the inlet that is of a constant diameter, a second section extending away from the first section that is of a decreasing diameter, and a third section extending away from the second section that is of an increasing diameter.

6. The flow control device recited in claim 1, wherein each outer helical fin extends around the collar between 45-1080 degrees.

7. The flow control device recited in claim 1, wherein the inner helical fins are integrally formed with the collar.

8. The flow control device recited in claim 1, wherein the inner helical fins are rotatable relative to the collar.

9. The flow control device recited in claim 1, wherein the collar includes opposed ends defining a pair of opposed planes spaced from each other, the inner fins being sized and configured so as to be bound between the pair of opposed planes.

10. The flow control device recited in claim 1, wherein the collar includes opposed ends defining a pair of opposed planes spaced from each other, at least one of the inner fins being sized and configured so as to traverse at least one of the pair of opposed planes.

11. A flow control device for use with a ball element having an inlet flow passage formed therein, the flow control device comprising:
   a body disposed about a primary axis, the body having a primary flow passage extending therethrough along the primary axis, the primary flow passage being positionable in communication with the inlet flow passage of the ball element to receive fluid therefrom; and
   an internal flow control body having a collar positioned within the body about the primary axis, a plurality of outer helical fins extending outwardly from the collar and defining a plurality of outer helical passageways, and a plurality of inner helical fins positioned inwardly from the collar and defining a plurality of inner helical passageways.

12. The flow control device recited in claim 11, wherein the internal flow control body includes a central shaft, the plurality of inner helical fins extending from the central shaft toward the collar.

13. The flow control device recited in claim 11, wherein the number of inner helical passageways differs from the number of outer helical passageways.

14. The flow control device recited in claim 11, wherein the body includes an inlet, an outlet, and an inner surface disposed about the primary axis and extending between the inlet and the outlet, the inner surface having a variable diameter between the inlet and the outlet.

15. The flow control device recited in claim 14, wherein the inner surface includes a first section adjacent the inlet that is of a constant diameter, a second section extending away from the first section that is of a decreasing diameter, and a third section extending away from the second section that is of an increasing diameter.

16. The flow control device recited in claim 11, wherein each outer helical fin extends around the collar between 45-1080 degrees.

17. The flow control device recited in claim 11, wherein the inner helical fins are integrally formed with the collar.

18. The flow control device recited in claim 11, wherein the inner helical fins are rotatable relative to the collar.

19. The flow control device recited in claim 11, wherein the collar includes opposed ends defining a pair of opposed planes spaced from each other, the inner fins being sized and configured so as to be bound between the pair of opposed planes.

20. The flow control device recited in claim 11, wherein the collar includes opposed ends defining a pair of opposed planes spaced from each other, the inner fins being sized and configured so as to traverse at least one of the pair of opposed planes.

* * * * *